Aug. 11, 1970     N. F. BRADSHAW     3,523,588

TRANSMISSION CONTROL DEVICE

Filed Sept. 19, 1968

INVENTOR
NORMAN FRANCIS BRADSHAW
BY: *John W. Gaines*
His Attorney

United States Patent Office 3,523,588
Patented Aug. 11, 1970

3,523,588
TRANSMISSION CONTROL DEVICE
Norman Francis Bradshaw, Goldthorpe, near Rotherham, England, assignor to International Harvester Company, Chicago, Ill., a corporation of Delaware
Filed Sept. 19, 1968, Ser. No. 760,904
Claims priority, application Great Britain, Sept. 19, 1967, 42,519/67
Int. Cl. B60k 23/02
U.S. Cl. 180—112                    4 Claims

ABSTRACT OF THE DISCLOSURE

Advancingly and retractively movable transmission lock with leading surfaces thereon, and effective automatically with advancement to first neutralize a transmission lever, and only then and thereafter to mechanically lock it to insure that the lever positively holds an automatic transmission in neutral. Cams on the leading surfaces straddle a pin on the lever, forcibly returning the lever to a neutral locked position as a safety measure. This safety measure gives assurance that a vehicle engine and wheels are disconnected from unwantedly applying power to one another through the transmission.

---

This invention relates to control devices and more particularly to control devices which are suitable for use with fluid-operated systems, i.e. hydraulic or pneumatic systems, for example a vehicle hydraulic transmission system including hydraulically operable clutches.

It is known to provide locking means for locking a control device in a neutral or non-operating position, for example in a crawler tractor which is equipped with a power shift transmission utilising a torque converter and hydraulically actuable forward and reverse clutches. Such a locking means positively retains the transmission control lever in a neutral position at which both the forward and reverse clutches are disengaged. In this way unintentional movement of the tractor as the result of some accidental operation of the control lever is prevented.

It is a main object of the present invention to provide an improved control device which includes a locking means capable of ensuring that effective locking of the control device in a neutral position takes place whenever the locking means is operated.

According to the present invention there is provided a control device for a fluid-operated system comprising a control member having at least one operating position and a neutral position, and a locking means which is arranged to lock the control member in the neutral position, and which, if moved to its locking position when the control member is in an operating position, acts to return the control member to the neutral position and to lock the control member in the neutral position.

In accordance with the present invention, therefore, if the control device is to be locked when the control member is in an operating position and therefore displaced from the neutral position, two-stage operation involving movement of both the control member and the locking member is avoided.

As already indicated the control device of the present invention is particularly suited for use in a vehicle having an hydraulic transmission. According to this aspect of the present invention, therefore, there is provided a vehicle including an hydraulic transmission having a plurality of hydraulically operable clutches for causing forward and reverse movement of the vehicle, and a control device for controlling the hydraulic transmission, the control device comprising an hydraulic control valve operable by a control member having a plurality of operating positions, each of which corresponds to a position of the control valve which is effective to supply pressurised fluid to one of the clutches, the control member also having a neutral position corresponding to a position in which the control valve does not supply pressurised fluid to any of the clutches, and locking means which is arranged to lock the control member in the neutral position, and which, if moved to its locking position when the control member is in any one of the operating positions, acts to return the control member to the neutral position and to lock the control member in the neutral position.

According to a preferred embodiment of the present invention there is provided a control device for an hydraulic system, the control device comprising an hydraulic control valve arranged to be operated by a control lever pivotable in a plane of movement containing a plurality of operating positions of the control lever and a neutral position of the control lever intermediate two of the operating positions, each of the operating positions of the control lever corresponding to an operating position of the control valve and the neutral position of the control lever corresponding to a neutral position of the control valve, and a locking means including a first member mounted on the control lever, and a second member pivotable for movement in a plane parallel to the plane of movement of the control lever, one of the first and second members being a cam follower and the other of the first and second members including opposed cam surfaces and a locating slot between the cam surfaces, whereby, when the second member of the locking means is pivoted while the control lever is in one of the operating positions, the cam follower will co-operate with one of the cam surfaces with consequential pivotal movement of the control lever to the neutral position thereof after which the cam follower may be caused to enter the locating slot to effect locking of the control lever in the neutral position.

This preferred embodiment of the invention is particularly suitable for use in tractors having an hydraulic transmission system with single forward and reverse clutches selectable by a transmission control lever which is movable through an arc of a circle so that an hydraulic control valve is actuated to direct pressurised oil to either the forward or the reverse clutch. In such a vehicle the control lever is usually arranged to be at one end of its travel when one of the clutches is engaged, and at the other end when the alternative clutch is engaged. A position midway between these extremes is adopted as the neutral position when neither of the two clutches is supplied with pressurised oil and both are therefore disengaged.

Advantageously the second member of the locking means in the control device according to the invention comprises a lock plate having opposed cam surfaces which are effective to direct a cam follower mounted on the control lever into a locating slot between the cam surfaces when the lock plate is pivoted in the plane parallel to the plane of movement of the control lever to lock the control lever in the neutral position.

The control device may be employed to control a system having the same number of operating positions on either side of the neutral position, for example the tractor transmission system having a single operating position on either side of the neutral position, or the control system may be used to control a system having different numbers of operating positions on either side of the neutral position, for example a vehicle transmission system having two forward positions and a single reverse position. In the embodiment which will be described the cam surfaces are straight surfaces, but curved surfaces may be employed as an alternative in suitable circumstances.

The present invention also comprehends a vehicle including an hydraulic transmission having a plurality of hydraulically operable clutches for causing forward and reverse movement of the vehicle and a control device as broadly described in the immediately preceding paragraphs for controlling the hydraulic transmission. Preferably the locking means is operable to pivot the second member thereof by means of a locking lever which, in the unlocked position, blocks the exit of the vehicle operator from the vehicle.

The invention will be better understood from the following detailed description of a preferred embodiment thereof which is made, by way of example, with reference to the accompanying schematic drawings, in which.

Figure 1:
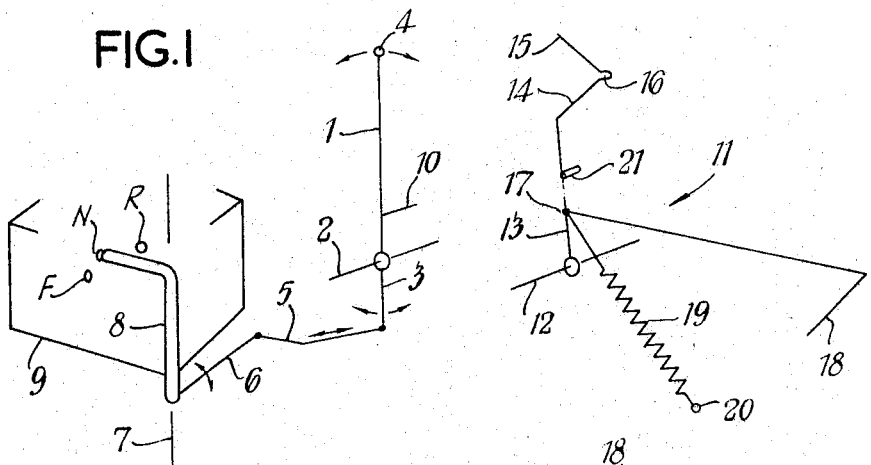
FIG. 1 is a line diagram showing a control device according to the invention for controlling the hydraulic transmission of a vehicle having single forward and reverse hydraulically operable clutches, the control device having the locking mechanism in the unlocked position.

Referring to the drawings and particularly to FIG. 1, there is shown a control lever 1 which is pivotable about an axis 2, and which includes an extension 3 on the further side of the pivot from a handle 4 by which the control lever is operated by the vehicle operator. The extension 3 of the control lever 1 is connected by a link 5 to one end of a lever 6 which is pivotable about an axis 7.

Rigidly connected to the lever 6, so as to pivot about the axis 7 with the lever 6, is a selector arm 8 which extends inside a valve chest 9. The selector arm 8 is hollow and is arranged to connect oil pressure to any one of the three positions marked as F, N and R in FIG. 1, F and R being the connections to hydraulically operated forward and reverse clutches, and the position N being a middle blank position which is the neutral position when neither the forward nor reverse clutch is actuated.

The control lever 1 carries a pin 10 which constitutes one of the members of the locking means. The remainder of the locking means is generally designated in FIG. 1 by the reference numeral 11, and is generally pivotable about an axis 12 which is parallel to the axis 2, about which the control lever 1 is pivotable.

The other member of the locking means is the locking member 13 which is directly pivotable about the axis 12, and which includes opposed straight cam surfaces 14 and 15 with a locating slot 16 between them. The member 13 is rigidly connected at 17 to an operating handle 18 and a spring 19 is connected between the point of connection 17 of the member 13 and the operating handle 18 and a fixed anchor point 20 on the metal framework of the vehicle. A stop 21 limits the clockwise movement of the member 13 about the axis 12 under the action of the spring 19 when the locking mechanism is not being used.

The operating handle 18 is preferably arranged in such a way that in the unused position of the locking mechanism the operating handle 18 completely blocks the exit from the vehicle operator's cab. Consequently the operator has to move the operating handle 18 in order to lock the control lever in the neutral position, in the manner which will be described, before the operator can dismount from the vehicle cab.

Figure 2:
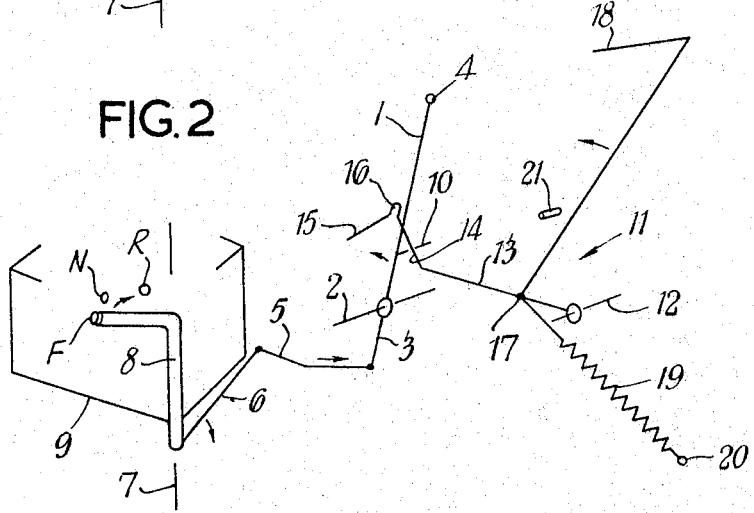
FIG. 2 shows the control device of FIG. 1 with the locking means being moved to the locking position when the control lever is in an operating position.

Referring now to FIG. 2, the control lever 1 is shown pivoted clockwise through a small angle from the neutral position so that oil pressure is fed by the selector arm 8 to the port F of the forward clutch. Also in FIG. 2 the operating handle 18 is shown raised in order to permit the operator to leave the vehicle cab. As a result of the raising of the operating handle 18 the member 13 is pivoted anticlockwise about the axis 12 so that the point 17 on the member 13 is moved to the position shown in FIG. 2, where spring 19 is effective to urge the member 13 to continue movement in the anticlockwise direction and to assist in completing the locking action which, in this case, is effected by the cam surface 14 and the locating slot 16.

During anticlockwise movement of the member 13 about the axis 12 with the control lever 1 in the forward position the cam surface 14 comes into engagement with the pin 10 which acts as a cam follower, and which is forced to move along the cam surface 14 in the direction of the slot 16. Consequently the control lever 1 is forced to move in an anticlockwise direction about the axis 2 with consequential movement of the selector arm 8 from connection with the port F of the forward clutch towards the neutral or blank position N.

The movement of the member 13 of the locking mechanism in an anticlockwise direction about the pivot 12 continues until the pin 10 is forced to enter the locating slot 16, at which time the control lever 1 is in the neutral position in which it has moved the selector arm 8 back to the mid position N which was shown in FIG. 1.

If the control lever 1 is in the reverse position movement of the operating handle 18 and the member 13 to lock the control device will bring the cam surface 15 into engagement with the pin 10, which will then be directed by the cam surface 15 into the locating slot 16 where the pin 10 is locked until a positive movement by the operator moves the operating handle 18 back to the unused position shown in FIG. 1, and so releases the pin 10 so that the control lever 1 may be moved to select the forward or reverse clutch.

When the control device is locked by location of the pin 10 in the slot 16 accidental movement of the control lever 1, for example by the operator contacting it when mounting or dismounting, is prevented.

Also in some vehicles it is possible to stop forward or reverse movement by reducing the engine speed until the torque converter no longer transmits the necessary power. In such a case the operator is not obligated to return the control lever to the neutral position, and the vehicle would be liable to sudden movement as a result of inadvertent operation of the throttle control. However, incorporation of a control device in accordance with the invention as described with reference to the drawings accompanying the specification in such a vehicle would have the effect of forcing the operator to lock the control lever in the neutral position before dismounting, and any subsequent accidental movement of the throttle control would not then cause the vehicle to move unintentionally.

Figure 3:
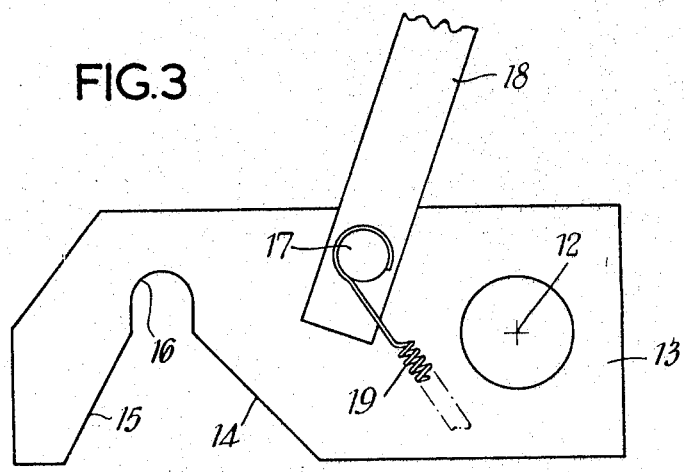
FIG. 3 shows a specific embodiment of the second member of the locking means in which the second member comprises a lock plate.

The member 13 of the locking means is preferably made as a lock plate, having cam surfaces 14 and 15 with a locating slot 16 between them as shown in FIG. 3.

It will be understood that the detailed apparatus may be modified in many ways within the ambit of the present invention, and in particular a roller may be incorporated on the pin 10 in order to facilitate movement of the pin 10 over a respective one of the cam surfaces 14 and 15. Conveniently the control lever 1 and the member 13 are both pivoted on the same part of the vehicle framework, and because their axes of pivot 2 and 12 are parallel the control lever 1 and the member 13 will move in planes parallel to one another.

The embodiments of the invention for which an exclusive property or privilege is claimed are defined as follows:

1. A vehicle including an hydraulic transmission, said transmission having:

a plurality of hydraulically operable clutches for causing forward and reverse movement of the vehicle, and an hydraulic clutch control valve therefor having operating positions and a neutral position intermediate two of the operating positions;

a transmission control lever connected to operate the hydraulic control valve, said control lever being pivotable in a plane of movement containing a plurality of operating positions of the control lever and a neutral position of the control lever intermediate two of the operating positions, each of the operating positions of the control lever corresponding to an operating position of the control valve and the neutral position of the control lever corresponding to a neutral position of the control valve; and a locking means, said locking means including:

a locking lever having locked and unlocked positions;

a first member mounted on the control lever; and a second member pivotable for movement in a plane parallel to the plane of movement of the control lever, one of the first and second members being a cam follower and the other of the first and second members including opposed cam surfaces and a locking slot between the cam surfaces whereby, when the second member of the locking means is pivoted while the control lever is in one of the operating positions, the cam follower cooperates with one of the cam surfaces wtih consequential pivotal movement of the control lever to the neutral position thereof after which the cam follower may be caused to enter the locating slot to effect locking of the control lever in the neutral position;

said locking means being operable to pivot the second member thereof by means of the locking lever, said locking lever in the unlocked position blocking the exit of the vehicle operator from the vehicle.

2. The invention of claim 1, wherein the second member of the locking means comprises a lock plate having opposed cam surfaces which are effective to direct a cam follower mounted on the control lever into a locating slot between the cam surfaces when the lock plate is pivoted in the plane parallel to the plane of movement of the control lever to lock the control lever in the neutral position.

3. The invention of claim 1, wherein the cam surfaces are straight surfaces.

4. The invention of claim 1, wherein the control lever has single forward and reverse operating positions on either side of the neutral position.

References Cited

UNITED STATES PATENTS 1,664,042  3/1928  McGinley _____ 180—824 XR

BENJAMIN HERSH, Primary Examiner

L. J. PAPERNER, Assistant Examiner

U.S. Cl. X.R.

74—473. 475